May 21, 1957 M. G. CROSBY 2,793,349

SIDEBAND TRANSMITTER

Filed Aug. 11, 1953

INVENTOR.
Murray G. Crosby
BY
Lippincott & Smith
ATTORNEYS

United States Patent Office 2,793,349

Patented May 21, 1957

2,793,349

SIDEBAND TRANSMITTER

Murray G. Crosby, Hicksville, N. Y.

Application August 11, 1953, Serial No. 373,598

15 Claims. (Cl. 332—41)

The invention relates to a method of and apparatus for recreating an electrical wave modulated in single sideband fashion at an increased power level. The sideband transmitter in accordance with the present invention is an improved type wherein the intelligence is conveyed in the sideband frequency and the carrier may be suppressed to such degree as is desired. The transmitter may be regarded as an originating transmitter or a relay station and in each instance is capable of providing single or double communication channels. In the case of the double communication system, an upper and a lower sideband, representative of different intelligence modulated on the same carrier frequency, are transmitted.

In the event that the transmitter is to be employed as an originating station, a carrier-frequency oscillator is provided for supplying a single-sideband modulator with carrier voltage. Where the device transmits on a single channel the usual balanced modulator and sideband filter may be employed; for supplying two channels two such modulators may be used, one with a filter which selects the upper sideband and the other with one which selects the lower sideband, the common oscillator supplying carrier frequency to both modulators. The pair of appropriate sidebands selected are passed to a combining circuit along with a portion of the carrier to provide, as an output, a resultant wave modulated in single-sideband fashion with two separate messages. The resultant wave may be viewed as comprising associated components of amplitude and frequency modulation.

The resultant wave is divided into two paths. The wave in the first path may or may not be passed through a limiter before reaching a frequency discriminator which detects the frequency-modulation components, developing therefrom a control wave which is applied to frequency-modulate a master oscillator for exciting the transmitter to be modulated, usually through a frequency-multiplying chain. The wave in the second path is applied to a percentage modulation detector. Such a detector, in contrast to the more usual envelope detector, supplies an output which is proportional to the ratio of the instantaneous signal amplitude to the average signal amplitude, the average being taken over some predetermined period. The resultant output is applied to amplitude-modulate the frequency-modulated output of the transmitter, which accordingly supplies an output which is a faithful reproduction of the original single-sideband modulated signal, so far as the information components are concerned; it results, however, in radiation of full carrier when no information is being transmitted, which is frequently an advantage, the carrier is transmitted at reduced level in normal transmission, to be reestablished at the receiver. If full carrier suppression is desired the transmitter modulator must be designed to respond to the D. C. component of the signal.

The frequency modulation components of the original or resultant wave travel through the transmitter on radio frequency carriers in contrast with the audio-frequency voltage representative of the percentage amplitude modulation of the original or resultant wave. Therefore, appropriate time delaying networks are provided to equalize the time required for the amplitude and frequency components to pass to the amplitude modulator so that these components will be combined in proper order to recreate a wave in accordance with the original. The time delay networks are interposed in the FM and AM paths and are preferably adjustable to permit correlation of the time of arrival of associated components at the amplitude modulator.

The system above described is particularly adapted to the conversion of existing transmitters of the ordinary double-sideband amplitude modulated type to the use of single-sideband modulation. Since all that is required in a conventional transmitter is the provision of frequency modulation on the master oscillator, the remaining equipment may therefore be housed separately in the form of an adapter unit.

Considered generally, and particularly when viewed as a relay transmitter, the device of the present invention is an amplifier of modulated waves as will now be set forth. Prior art systems for the amplification of modulated carriers usually employ amplifiers of the class B type wherein careful adjustment is required to reduce the non-linear amplitude distortion. The tubes of such amplifiers are necessarily operated at power levels below their maximum rating in order to provide the necessary degree of linearity. However, as is well known, amplifiers biased for class C operation utilize the maximum capabilities of the power tubes, but in so doing remove much of the amplitude modulation because of tube saturation. Since the nonlinearity introduced by amplifiers employing class C conditions affects only the amplitude components of the waves being amplified, and since the FM path of the transmitter of the present invention is provided to preserve only the FM components, such high efficiency amplifiers may be employed to raise the power level of the second carrier modulated by the frequency components. Also, since the audio voltages representative of the amplitude modulation are isolated in the second path through the transmitter, suitable audio-amplifiers may be employed to amplify the audio voltages.

A modification of the present invention includes the provision of feedback to insure fidelity of transmission. Means are provided for deriving a voltage representative of the amplitude modulation components of the transmission output. This voltage is then compared with the voltage indicative of the amplitude modulation components of the original single-sideband or resultant wave. The difference voltage obtained from this comparison is applied as the amplitude modulation component input to the amplitude modulator. Likewise, a similar comparison of the frequency modulation components provides a difference voltage applied as the input to the frequency modulator.

This system of difference feedback is related to that shown and described in United States application for Letters Patent, Serial No. 278,977, now Patent No. 2,761,105 issued August 28, 1956, previously filed by this applicant and entitled Sideband Transmitter.

In the transmission system as outlined, the transmission output may be at any desired frequency and power level. Frequency multiplication may be accomplished in the frequency multiplier circuits and the increased power level is effected through the separate radio or high-frequency and audio-frequency amplifiers. The foregoing applies equally as well to conventional transmitters adapted for sideband operation in accordance with the present invention.

With the foregoing in mind, among the objects of the present invention are the provision of efficient amplification for single-sideband waves; the provision of an adapter for converting conventional transmitters to sideband operation; the provision of a detector capable of providing an indication of the percentage of modulation of a wave of the single-sideband type; the provision of a single-sideband transmitter capable of single or double communication channels; the provision of a sideband system of transmission capable of efficient high power transmission; and the provision of a sideband transmission system capable of automatic control of the output modulation.

The foregoing will be more apparent from a reading of the following detailed description of the invention as it relates to the accompanying drawings wherein.

Figures 1, 2, 3, 4:
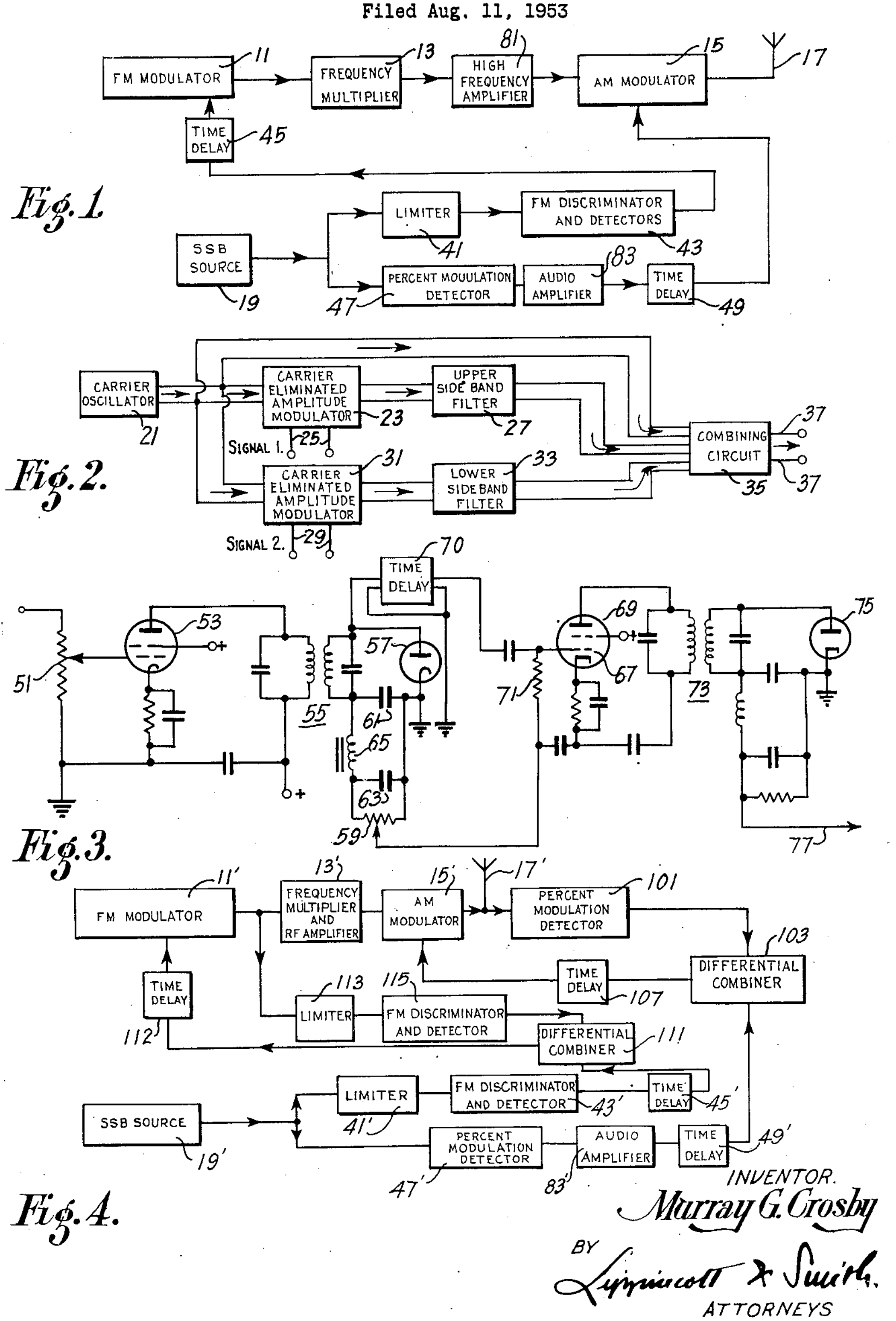
Fig. 1 is a schematic representation in block form of a transmitter operative in accordance with the basic principles of the present invention.
Fig. 2 is a block representation of a suitable single-sideband modulator for use in the transmitter of Fig. 1.
Fig. 3 is a circuit diagram of a percentage modulation detector for use in the transmitter of Fig. 1.
Fig. 4 is a modified form of the transmitter of Fig. 1, including automatic feedback control.

The embodiment of the invention disclosed in Fig. 1 may represent a transmitter in accordance with the present invention or a transmitter of conventional double-sideband, amplitude-modulated type adapted for operation in accordance with the principles herein to be explained. An FM modulator 11 is connected to supply a frequency multiplier circuit 13 and an AM modulator 15 of a transmitter to be converted to single-sideband operation. The transmission output is radiated on antenna 17. These components are all of conventional character and hence are depicted in block form.

A source 19 is provided to supply an input wave modulated in single-sideband fashion. It is to be noted that the source 19 may comprise a receiving antenna if the device of Fig. 1 is to be considered as a relay station. In the event that the transmitter of Fig. 1 is considered as an originating station, the single-sideband source 19 may be represented by the conventional single-sideband modulator shown in Fig. 2, which provides an output of separately modulated upper and lower sidebands with the desired amount of carrier reduction. In Fig. 2 an oscillator 21 supplies a carrier frequency voltage to carrier-eliminated amplitude modulator 23. The modulator 23 is preferably of the balanced type wherein a modulating signal 1, applied at terminals 25, combines with the carrier frequency from oscillator 21 to provide upper and lower sideband outputs. An upper sideband filter 27 selects and passes only the upper sideband appearing at the output of modulator 23. Likewise signal 2, introduced at terminals 29 of a further carrier-eliminated amplitude modulator 31, is combined with the carrier from oscillator 21 to provide upper and lower sidebands representative of the intelligence applied at terminals 29. Lower sideband filter 33 selects the lower sideband modulation product as developed in modulator 31. A combining circuit 35 is provided to receive the upper and lower sidebands from filters 27 and 33 along with a desired portion of the carrier frequency output of oscillator 21. The circuit 35 may comprise a conventional summation circuit supplying a resultant wave suppressed at the output terminals 37.

It should be mentioned that for pure single-sideband operation either signal 1 or signal 2 may be omitted to provide at output terminals 37 the well-known single-sideband modulated wave. However, a pair of communication channels is provided if signal 1 and signal 2 are representative of different intelligence or information to be transmitted. The fact that the signals are dissimilar accounts for the provision of a resultant wave at terminals 37 which differs from the conventional double-sideband amplitude modulated wave. The carrier of the latter type wave is shifted oppositely in phase by the respective sidebands but the resultant wave provided by dissimilar signal modulations is of the single-sideband modulated type having components of frequency modulation and associated components of amplitude modulation.

A limiter 41 (Fig. 1) is provided in a path between the single-sideband source 19 and the FM modulator 11 to remove the envelope of the resultant wave and pass the components of frequency modulation to an FM discriminator and detector network 43. The separate limiter stage 41 is not always necessary since its function may be supplied by other elements in the circuit. The voltage output of the discriminator is applied through time-delay network 45 to modulate a second carrier wave developed by the master oscillator of FM modulator 11. The degree of multiplication applied by frequency multiplier 13 to the modulated second carrier and the degree of modulation applied by FM modulator 11 are so adjusted that the frequency modulation components passed to AM modulator 15 are the same as the frequency modulation components appearing at the output of the single-sideband source 19.

The resultant wave appearing at the output of single-sideband source 19 is also applied to a percent-modulation detector 47, which is amplitude-responsive only, to develop a voltage in accordance with the percentage of modulation of the resultant wave. This voltage is passed through a further time-delay network 49 to the AM modulator 15 for combination with the voltage indicative of the frequency modulation components to provide a transmission wave in accordance with the resultant or original single-sideband wave of source 19.

The percent-modulation detector 47 provides a voltage in accordance with the percentage modulation of the resultant wave appearing at the output of source 19 as distinguished from an envelope voltage provided by conventional detectors. A typical circuit for the detector 47 is shown in Fig. 3 wherein a control voltage which is proportional to the average amplitude of the single-sideband or resultant wave is developed. This voltage is then used to bias a variable-gain amplifier stage negatively so as to maintain a constant average amplitude for the single-sideband wave. The constant average amplitude wave is then detected to obtain the audio-frequency output representative of the amplitude modulation components. Hence an output may be obtained from a wave comprised of a reduced carrier and a single-sideband which is independent of the average amplitude of the wave but is proportional to the difference between the instantaneous and average amplitudes. This is a detection of the percentage modulation of such a wave.

The reason for the percentage modulation detection is occasioned by the peculiar characteristics of a reduced carrier, single-sideband envelope. As the modulation input is raised the percentage modulation increases linearly until the sideband equals the strength of the reduced carrier. Of course as the modulation is raised still further the sideband strength increases above the carrier strength; so that, the sideband is considered as the carrier for calculating the percentage modulation. Therefore, the percentage of modulation rises from zero to 100 percent and then falls off inversely proportional to the modulation input. However, since it is desirable to obtain a detected output level which is proportional to the percentage of modulation of the single-sideband envelope, a detector must be provided which follows this peculiar law. The well-known diode detector will provide the proper output for the range of sideband amplitudes between zero and an amplitude equal to that of the reduced carrier, but thereafter provides a constant output for sidebands greater than the carrier. The increase in sideband amplitude tends to raise the diode detector output but this is compensated for by a corresponding decrease in percentage of modulation so that the resultant output is constant. The percentage modulation detector of Fig.

3 avoids such compensation and produces an output which is always directly proportional to the percentage of modulation regardless of the relative amplitudes of the sidebands and carrier.

For example, let it be assumed that the reduced carrier strength is one volt and that the sideband strength is two volts. The average amplitude of such a wave is two volts and the percentage modulation is 50 percent. However, if the modulation is doubled, the sideband amplitude rises to 4 volts but the carrier is unaffected and remains at one volt. For this situation the average amplitude is 4 volts and the percentage modulation is 25 percent. The ordinary envelope detector would produce an output of one volt (assuming perfect detection) for each example. However, the percentage modulation detector produces twice the audio output for the 50 percent modulation example.

The percentage modulation detector of Fig. 3 modulates the average amplitude of the wave downward in accordance with the average amplitude. The circuitry for effecting this will now be explained.

The resultant or single-sideband wave from source 19 is applied to potentiometer 51, connected in the input circuit of an amplifier employing tube 53. An output transformer 55 passes the amplified resultant wave to a diode 57 which detects the average amplitude of the wave and provides a voltage proportional to that average amplitude across resistor 59. A pair of condensers 61 and 63 and a choke 65 comprise a low pass filter which removes the audio frequency components of the detected wave insuring that only the average amplitude voltage is developed across resistor 59. The time constant is long enough to permit filter cut-off at the lowest modulation frequency, perhaps 250 cycles for speech. This negative voltage is applied to the control grid 67 of a variable-gain amplifier tube 69 through input resistor 71. The resultant or single-sideband wave is also applied to grid 67, but through a time delay network 70. Since the control voltage developed at resistor 59 (corresponding to the average amplitude) is inherently delayed by the low pass filter, it is desirable to delay the controlled voltage (single-sideband wave) so as to provide coincidence of arrival at grid 67. Hence sudden wave fronts, oftentimes present in speech waves, will follow the percent modulation law rather than present undesirable transient effects. The low-pass filter has a time delay of approximately one-fourth the period of cut-off frequency, one millisecond for 250 cycle cut-off.

Time delay network 70 may comprise any conventional design. The simplest type might be a multi-section band-pass filter which cuts off above the maximum modulation frequency and provides a delay to passed frequencies of the order of 1 millisecond. The art of radar and also of volume limiting offers additional devices suitable for use as time delay network 70. The controlled amplifier comprising the tube 69 is modulated downward in accordance with the increase in average amplitude of the original wave to provide a new modulated wave at its output transformer 73. The new wave is applied to a second detector (of conventional character) shown as the diode 75 which detects the audio-frequency components and applies it through lead 77 to the delay network 49 of Fig. 1 and hence to the AM modulator 15.

The synchronization of arrival of frequency and amplitude components of modulation at amplitude modulator 15 is further attained through time delay networks 45 and 49. Time delay network 45 may comprise the sole delay (other than network 70 above discussed) necessary in the circuit of Fig. 1 because the audio components of modulation usually pass through the transmitter more slowly than the frequency modulation components which are modulated on the original carrier or the second carrier developed by the master oscillator of FM modulator 11. Certain circuits may reverse the usual condition, however, and the delay network 49 is shown to indicate that whichever signal leads in a specific apparatus is delayed enough to bring the signals in the two paths into coincidence. The adjustable time delay network 49 is relatively simple to build in contrast with the radio frequency delay since the delay usually necessary is minute and the problem of tuning of the network is substantially eliminated. Therefore, the convenience of adjustment offered by the additional time delay network 49 adequately justifies its cost.

The provision of separate paths through the transmitter for the frequency and amplitude modulation components permits efficient amplification of these separate components because amplifiers especially suited for the particular band of frequencies of the separate components are employed. One or more stages of R. F. amplification effective to increase the power level of the modulated second carrier developed in F. M. modulator 11, is included in high frequency amplifier 81. Also, if desired, audio amplification may be provided by an amplifier 83 interposed between percent modulation detector 47 and AM modulator 15 to amplify the voltage indicative of the audio or amplitude modulation components.

Such an arrangement is also incorporated in Fig. 4 wherein the transmitter of Fig. 1 is provided with feedback circuitry for controlling the transmission output. Throughout the description of Fig. 4 the same numbers, primed, designate corresponding parts of Fig. 1 and each of the units so designated functions in the manner hereinbefore described. Accordingly, only the added components and their functions will be described.

A further percent modulation detector 101 is connected to receive a portion of the transmission output from AM modulator 15'. The detector 101 may be connected directly to the output side of AM modulator 15', to antenna 17' or coupled to the latter through a pickup coil (not shown). The voltage derived by percent modulation detector 101, indicative of the amplitude modulation components of the transmission wave, is applied to a differential combiner 103. The output of percent modulation detector 47', which is a voltage representative of the amplitude components of modulation derived from the single-sideband source 19', is also supplied to the differential combiner 103 via audio amplifier 83' and the time delay network 49'. The output of differential combiner 103 is connected to supply the modified component of amplitude modulation to AM modulator 15' through an added time delay network 107.

The differential combiner 103, in its simplest form, may comprise a pair of resistors respectively supplied with voltages representative of the amplitude components of modulation derived from the single-sideband source 19' and the amplitude components of modulation derived from the output of percent modulation detector 101. It is the difference magnitude of these voltages which is applied to the AM modulator 15' to provide the proper amplitude modulation input. In like manner the components of frequency modulation appearing at the output of FM modulator 11' are compared with the frequency modulation components derived from single-sideband source 19' in differential combiner 111 ad the voltage resulting from this comparison is applied to FM modulator 11' via time delay network 112 to supply the proper input frequency modulation components for the modulator 11'. A limiter 113 is connected in the feedback path to eliminate any amplitude modulation from the portion of the output of FM modulator 11' and to pass the frequency modulation components to a further FM discriminator and detector 115. The output voltage derived from the discrimination process is compared with the voltage indicative of the frequency modulation components obtained from the single-sideband source 19 in the differential combiner 111. The resulting difference voltage maintains the correct input to FM modulator 11'.

In both the frequency and amplitude feedback circuits it is to be understood that the differential combiners 103 and 111 compare the voltages as to magnitudes only. Ordinary principles of feedback operation obtain and hence to achieve optimum cancellation of any distortion introduced by the transmitter components, the gain around the feedback loops should be high.

The power level of the modulated second carrier developed by FM modulator 11′ is increased by RF amplifiers included in the frequency multiplier stage 13′. Class C amplification may be employed since there are no amplitude modulation components to preserve, yielding high efficiency operation without undue complications. High efficiency linear audio amplifier stages are employed at 83′ to amplify the voltage indicative of the amplitude components of modulation. It should be apparent that further audio amplifying stages may be included between the differential combiner 103 and the AM modulator 15′ to amplify further the input amplitude components of modulation. It should be noted that the time delay networks 112 and 107, effective to delay the frequency and amplitude modulation components as modified by the feedback, may be constructed to impose all necessary delay for the separated modulation components. Hence the delay networks 45′ and 49′ may often times be eliminated without serious effect upon the operation of the transmitter of Fig. 4.

The transmission system of the present invention offers a great deal of flexibility as to its operation. The single-sideband source 19′ employs its own local oscillator, the frequency of which may be determined as desired. Since the master oscillator of the FM modulator is not dependent upon this carrier frequency, its own frequency may be adjusted as desired. Hence, frequency multiplication may be employed as between these two oscillators and also in the multiplier stage effective to raise the frequency of the second carrier developed by the master oscillator. The transmission system may provide single or double sideband transmission circuits, as well as adapting circuits for the conversion of existing transmitters to sideband operation. It should further be realized that the transmission system herein disclosed is adapted to operate upon all forms of amplitude modulation waves having both frequency and amplitude modulation components to be preserved.

What is claimed is:

1. A sideband transmitter for modulated waves having instantaneous amplitude and frequency components, comprising means responsive to the modulated waves for continuously deriving a voltage therefrom indicative of the percentage of amplitude modulation, further means also responsive to the modulated waves for continuously deriving a voltage therefrom indicative of the frequency modulation components, a frequency modulator including a master oscillator responsive to the voltage indicative of the frequency modulation components for developing a second carrier wave modulated in accordance with the frequency modulation components, and amplitude modulator means connected to receive the voltage indicative of the percentage of amplitude modulation and the modulated second carrier wave to provide a transmission output in accordance with the original modulated waves.

2. A relay transmitter for single-sideband modulated waves having instantaneous amplitude and frequency components, means responsive to the modulated waves for continuously deriving a voltage therefrom indicative of the percentage of amplitude modulation, further means also responsive to the modulated waves for continuously deriving a voltage therefrom indicative of the frequency modulation components, a frequency modulator including a master oscillator responsive to the voltage indicative of the frequency modulation components for developing a second carrier wave modulated in accordance with the frequency modulation components, means for increasing the power level of the modulated second carrier wave, means for amplifying the voltage indicative of the percentage of amplitude modulation, and amplitude modulator means connected to receive the amplified voltage indicative of the percentage of amplitude modulation and the modulated second carrier wave to provide a transmission output in accordance with the original modulated waves.

3. A sideband transmitter comprising, in combination, a source of carrier frequency supply, a modulator connected to receive carrier energy from the source and separate input signal energy to produce a resultant modulated wave having instantaneous amplitude and frequency components, means responsive to the resultant wave for continuously deriving a first voltage therefrom indicative of the frequency modulation components and a second voltage indicative of the percentage of amplitude modulation, a frequency modulator including a master oscillator responsive to the voltage indicative of the frequency modulation components for developing a second carrier wave modulated in accordance with the frequency modulation components, means for increasing the power level of the modulated second carrier wave, and amplitude modulator means connected to receive the voltage indicative of the percentage of amplitude modulation and the modulated second carrier wave to provide a transmission output modulated in accordance with the original signal energy.

4. Circuit arrangements for adapting a conventional double-sideband amplitude modulated transmitter, of the type including an amplitude modulator, for single-sideband transmission comprising, in combination, a source of carrier frequency supply voltage, a single-sideband modulator connected to receive carrier frequency voltage from said source, means for applying signal energy to the single-sideband modulator to provide output voltages in the form of a resultant wave having components of amplitude and frequency modulation, means for deriving by detection the frequency components of modulation from the resultant wave, an FM exciter responsive to the derived frequency components to supply a second carrier modulated in accordance with the frequency components to said amplitude modulator, and means for deriving by detection a voltage indicative of the percentage amplitude modulation of the resultant wave and for applying said voltage to the amplitude modulator for combination with the frequency components.

5. Circuit arrangements for adapting a conventional double-sideband amplitude modulated transmitter, of the type including radio and audio frequency amplifiers, frequency multipliers, and an amplitude modulator, for single-side-band transmission comprising, in combination, a source of carrier frequency supply voltage, a single-sideband modulator connected to receive carrier frequency voltage from said source, means for applying signal energy to the single-sideband modulator to provide output voltages in the form of a resultant wave having components of amplitude and frequency modulation, means for deriving by detection the frequency components of modulation from the resultant wave, an FM exciter responsive to the derived frequency components to supply a second carrier modulated in accordance with the frequency components to said amplitude modulator via the frequency multipliers and radio frequency amplifiers, means for deriving by detection a voltage indicative of the percentage amplitude modulation of the resultant wave and for applying said voltage to the amplitude modulator via the audio frequency ampifiers for combination with the frequency components, and means for providing coincidence of associated amplitude and frequency modulation components in the amplitude modulator.

6. Circuit arrangements for adapting a conventional double-sideband amplitude modulated transmitter, of the type including audio and radio frequency amplifying means and an amplitude modulator, for single-sideband transmission from input energy in the form of a resultant wave having components of amplitude and frequency modulation, means for deriving by detection the frequency components of modulation from the resultant wave, an FM exciter responsive to the derived frequency components to supply a second carrier modulated in accordance with the frequency components to said amplitude modulator via the frequency multipliers and radio frequency amplifying means, means for deriving by detection a voltage indicative of the percentage amplitude modulation of the resultant wave and for applying said voltage to the amplitude modulator via the audio amplifying means for combination with the frequency components, and means providing coincidence of arrival of associated components of amplitude and frequency modulation.

7. A sideband transmitter for single-sideband waves having instantaneously associated components of amplitude and frequency modulation, comprising, in combination means responsive to the single-sideband waves for continuously deriving a voltage therefrom indicative of the percentage of amplitude modulation, further means also responsive to the modulated waves for continuously deriving a voltage therefrom indicative of the frequency modulation components, means responsive to the voltage indicative of the frequency modulation components for developing a master carrier wave modulated in accordance with the frequency modulation components, and means connected to receive the voltage indicative of the percentage of amplitude modulation and the modulated master carrier wave to modulate the latter by the former and thereby provide a transmission output in accordance with the original single-sideband waves.

8. A relay transmitter for single-sideband modulated waves having instantaneously associated amplitude and frequency components, means responsive to the modulated waves for continuously deriving a voltage therefrom indicative of the percentage of amplitude modulation, further means also responsive to the modulated waves for continuously deriving a voltage therefrom indicative of the frequency modulation components, oscillator means adapted to be frequency modulated responsive to the voltage indicative of the frequency modulation components for developing a master carrier wave modulated in accordance with the frequency modulation components, means for increasing the power level of the modulated carrier wave, means for amplifying the voltage indicative of the percentage of amplitude modulation, amplitude modulator means connected to receive the amplified voltage indicative of the percentage of amplitude modulation and the modulated carrier wave, and means for increasing the transit time of the modulated carrier wave to the amplitude modulator means to insure a transmission output from the amplitude modulator means in accordance with the original modulated waves.

9. A sideband transmitter comprising, in combination, a source of carrier frequency supply, a single-sideband modulator connected to receive carrier energy from the source and separate input signal energy to produce a resultant modulated wave having instantaneously associated amplitude and frequency components of modulation, integrating and detecting means responsive to the resultant wave for continuously deriving a voltage therefrom indicative of the percentage of amplitude modulation, frequency discriminator means also responsive to the resultant wave for continuously deriving a voltage therefrom indicative of the frequency modulation components, a frequency modulator including a master oscillator responsive to the voltage indicative of the frequency modulation components for developing a master carrier wave modulated in accordance with the frequency modulation components, high frequency amplifier means for increasing the power level of the modulated master carrier wave, and amplitude modulator means connected to receive the voltage indicative of the percentage of amplitude modulation and the modulated master carrier wave to provide a high level transmission output modulated in accordance with the original signal energy.

10. Circuit arrangements for adapting a conventional double-sideband amplitude modulated transmitter, of the type including a master oscillator and an amplitude modulator, for single-sideband transmission comprising, in combination, a source of carrier frequency supply voltage, a single-sideband modulator connected to receive carrier frequency voltage from said source, means for introducing signal energy to the single-sideband modulator to provide output voltages in the form of a resultant wave having components of amplitude and frequency modulation, means for deriving by detection the frequency components of modulation from the resultant wave, frequency modulator means responsive to the derived frequency components to modulate the master oscillator in accordance with the frequency components, means for introducing the output of the modulated master oscillator to the amplitude modulator, and means for deriving by detection a voltage indicative of the percentage amplitude modulation of the resultant wave and for applying said voltage to the amplitude modulator for combination with the frequency components.

11. Circuit arrangements for adapting a conventional double-sideband amplitude modulated transmitter, of the type including a master oscillator, audio and radio frequency amplifying means and an amplitude modulator, for single-sideband transmission from input energy in the form of a resultant wave having instantaneously associated components of amplitude and frequency modulation, means for deriving by detection the frequency components of modulation from the resultant wave frequency modulator means responsive to the derived frequency components to supply modulation input to the master oscillator in accordance with the frequency components, means for supplying the amplitude modulator via the radio frequency amplifying means with a carrier developed by the master oscillator and modulated in accordance with the frequency modulation components, means for deriving by detection a voltage indicative of the percentage amplitude modulation of the resultant wave and for applying said voltage to the amplitude modulator via the audio amplifying means for combination with the frequency components, and means providing coincidence of arrival of associated components of amplitude and frequency modulation at the amplitude modulator.

12. In a modulated wave amplifier, means to derive a single-sideband wave from input carrier and modulation energy, a pair of separate paths for the single-sideband wave, frequency detecting means connected in one of the paths for deriving a voltage indicative of frequency modulation components of the single-sideband wave, means in said one of the paths to develop a master carrier frequency modulated by said voltage, means in said one of the paths for increasing the power level of the frequency modulated master carrier, means connected in the other of said paths for deriving a voltage indicative of the percentage amplitude modulation of the single-sideband wave, means in the other of said paths to receive and amplify said last mentioned voltage, and amplitude modulator means connected in common to said paths to receive the frequency modulated master carrier and the amplified voltage indicative of the percentage modulation to develop an output single-sideband wave modulated in accordance with the original single-sideband wave and of higher power level.

13. In a modulated wave amplifier, a pair of paths to receive an input single-sideband wave, frequency detecting means connected in one of the paths to derive from the wave a voltage indicative of the frequency modulation components thereof, frequency modulator means responsive to said voltage to develop a master carrier modulated in accordance with said frequency components, a percentage modulation detector connected in the other of said paths to develop a voltage indicative of the percent modulation of the single-sideband wave, an amplitude modulator connected in common to the paths, means for amplifying the modulated master carrier and introducing it to the amplitude modulator, means for amplifying the voltage indicative of the percent modulation and introducing it to the amplitude modulator, a load circuit connected to receive the output of the amplitude modulator, a further percent modulation detector connected to the load circuit to derive a voltage in accordance with the percentage modulation of the amplitude modulator output, means for modifying the voltage indicative of the percent modulation as applied to the amplitude modulator by the voltage derived by the further percent modulation detector, and means for equalizing the signal component passage time along each path to the amplitude modulator.

14. In a modulated wave amplifier, means to derive a single-sideband wave from input carrier and modulation energy, a pair of separate paths for the single-sideband wave, frequency detecting means connected in one of the paths for deriving a voltage indicative of frequency modulation components of the single-sideband wave, means in said one of the paths to develop a master carrier frequency modulated by said voltage, means in said one of the paths for increasing the power level of the frequency modulated master carrier, means connected in the other of said paths for deriving a voltage from the single-sideband wave indicative of the ratio of the instantaneous signal amplitude to the average signal amplitude, means in the other of said paths to receive and amplify said last mentioned voltage, and amplitude modulator means connected in common to said paths to receive the frequency modulated master carrier and the amplified ratio voltage to develop an output single-sideband wave modulated in accordance with the original single-sideband wave and of higher power level.

15. In a modulated wave amplifier, a pair of paths to receive an input single-sideband wave, frequency detecting means connected in one of the paths to derive from the wave a voltage indicative of the frequency modulation components thereof, frequency modulator means responsive to said voltage to develop a master carrier modulated in accordance with said frequency components, a percentage modulation detector connected in the other of said paths to develop a voltage from the single-sideband wave indicative of the ratio of instantaneous signal amplitude to average signal amplitude, an amplitude modulator connected in common to the paths, means for amplifying the modulated master carrier and introducing it to the amplitude modulator, means for amplifying the ratio voltage and introducing it to the amplitude modulator, a load circuit connected to receive the output of the amplitude modulator, a further percent modulation detector connected to the load circuit to derive a voltage in accordance with the ratio of instantaneous signal amplitude to average signal amplitude, means for modifying the first mentioned ratio as applied to the amplitude modulator by the second mentioned voltage derived by the further percent modulation detector, and means for equalizing the signal component passage time along each path to the amplitude modulator.

References Cited in the file of this patent

UNITED STATES PATENTS

| | | |
|---|---|---|
| 2,162,882 | Farnham | June 20, 1939 |
| 2,173,145 | Wirkler | Sept. 19, 1939 |
| 2,198,226 | Peterson | Apr. 23, 1940 |
| 2,270,697 | Clark | Jan. 20, 1942 |
| 2,576,429 | Villard | Nov. 27, 1951 |
| 2,666,133 | Kahn | Jan. 12, 1954 |